United States Patent
Tanaka

(10) Patent No.: US 7,590,766 B2
(45) Date of Patent: Sep. 15, 2009

(54) IMAGE PROCESSING SYSTEM, IMAGE FORMING SYSTEM, INFORMATION PROCESSING SYSTEM, IMAGE PROCESSING METHOD, INFORMATION PROCESSING METHOD AND COMPUTER READABLE MEDIUM

(75) Inventor: Noriaki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 120 days.

(21) Appl. No.: 11/878,544

(22) Filed: Jul. 25, 2007

(65) Prior Publication Data

US 2008/0162736 A1    Jul. 3, 2008

(30) Foreign Application Priority Data

Dec. 27, 2006    (JP)    ............................. 2006-352757

(51) Int. Cl.
*G06F 3/00*    (2006.01)

(52) U.S. Cl. ............................... 710/5; 710/20; 710/21; 358/1.1

(58) Field of Classification Search ........................ None
See application file for complete search history.

(56) References Cited

U.S. PATENT DOCUMENTS

| | | | | |
|---|---|---|---|---|
| 6,571,329 | B1 * | 5/2003 | Ukai et al. | ................... 712/205 |
| 2002/0024575 | A1 * | 2/2002 | Sato | ........................... 347/104 |
| 2007/0176802 | A1 * | 8/2007 | Fay et al. | ...................... 341/50 |

FOREIGN PATENT DOCUMENTS

| | | |
|---|---|---|
| JP | A 07-001793 | 1/1995 |
| JP | A 2002-202869 | 7/2002 |

* cited by examiner

*Primary Examiner*—Eron J Sorrell
(74) *Attorney, Agent, or Firm*—Oliff & Berridge, PLC

(57) ABSTRACT

An image processing system includes: a receiving section that receives print information including at least a first control command indicating a first print setting and a second control command embedded in a document to be printed and indicating a second print setting; an interpreting section that interprets the first control command and the second control command; and a controller that performs a control so as to prohibit execution of processing based on one of the first control command and the second control command when the interpreting section determines that both of the first control command and the second control command cannot be concurrently executed.

17 Claims, 14 Drawing Sheets

PRIORITY ORDER OF REPLACEMENT SHEETS (1) A5 / VERTICAL (2) B5 / VERTICAL (3) A4 / VERTICAL (4) B4 / HORIZONTAL (5) A3 / HORIZONTAL (a) CLEAR BUTTON IS DEPRESSED    (B) "A3/HORIZONTAL" SHEETS ARE SUPPLIED

IMAGE PROCESSING SYSTEM, IMAGE FORMING SYSTEM, INFORMATION PROCESSING SYSTEM, IMAGE PROCESSING METHOD, INFORMATION PROCESSING METHOD AND COMPUTER READABLE MEDIUM

CROSS-REFERENCE TO RELATED APPLICATION

This application is based on and claims priority under 35 USC §119 from Japanese Patent Application No. 2006-352757 filed Dec. 27, 2006.

BACKGROUND (i) Technical Field

The present invention relates to an image processing system, an image forming system, an information processing system, an image processing method, an information processing method and a computer readable medium.

(ii) Related Art

In addition to control methods and image processing apparatus which control various print functions according to commands of a print control language, image processing apparatus are known which are configured so as to be able to perform processing (what is called passthrough processing) that makes it possible to control the image processing apparatus without requiring a user to make setting using a printer driver by embedding commands passed from an application in a print document at the time of printing of the document.

When printing is performed by passthrough processing, information such as a text is sent to an image processing apparatus but is not displayed on the screen which is used for generation of a document.

With the passthrough processing in which a person who generates a document, for example, embeds a control command that designates a particular sheet in the document, there may occur, depending on the manner of designation of the sheet, an event that an output result or a post-processing result is obtained that is not intended by, for example, a person who has generated the document.

As for the designation of post-processing, there are restrictions (prohibition conditions) that each kind of post-processing is effective only with particular sheet sizes (e.g., punching cannot be performed if the control command includes designation of a sheet size "B5/vertical"). However, when the passthrough function (i.e., a function that makes it possible to control an image processing apparatus without requiring a user to make setting using a printer driver by embedding commands passed from an application in a print document at the time of printing of the document) is utilized which allows a person who is generating a document, for example, to freely bury control commands, if the person who is generating a document, for example, does not know those restrictions, there may occur an event that he or she erroneously designates a sheet size "B5/vertical," for example, in a passthrough field. In such a case, post-processing is canceled.

SUMMARY

According to an aspect of the invention, there is provided an image processing system including:

a receiving section that receives print information including at least a first control command indicating a first print setting and a second control command embedded in a document to be printed and indicating a second print setting;

an interpreting section that interprets the first control command and the second control command; and a controller that performs a control so as to prohibit execution of processing based on one of the first control command and the second control command when the interpreting section determines that both of the first control command and the second control command cannot be concurrently executed.

BRIEF DESCRIPTION OF THE DRAWINGS

Exemplary Embodiments of the present invention will be described in detail based on the following figures, wherein.

Figure 1:
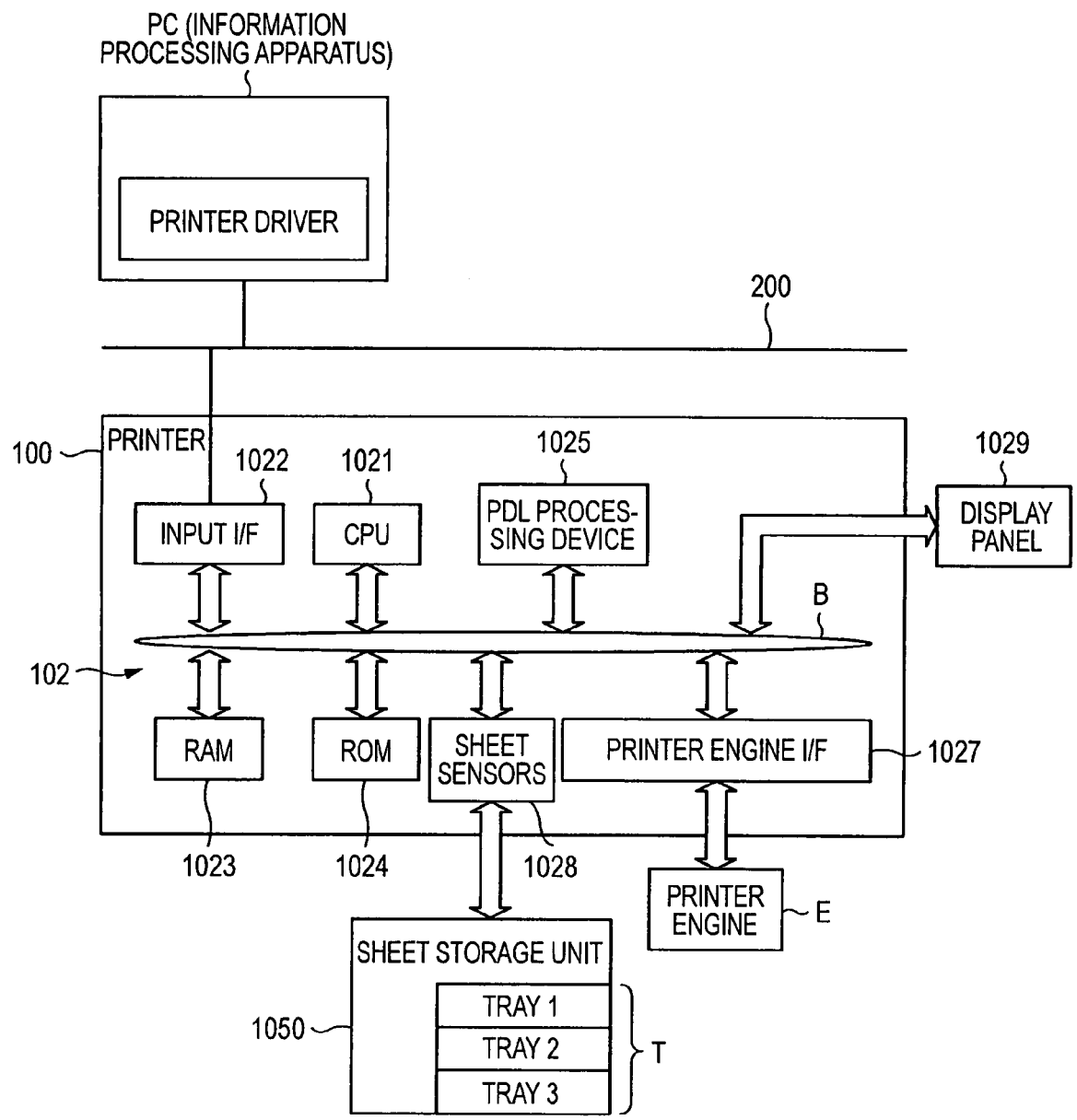
FIG. 1 is a block diagram showing the configuration of a control system of a printer which is an image forming apparatus according to an exemplary embodiment of the invention.

Reference numerals and signs in the drawings are set forth below.

100: Printer (image forming apparatus)
102: Printer control unit (image processing apparatus)
1021: CPU (controller, computing section, generating section)
1022: Input interface (input I/F; receiving section)
1025: PDL processing device (control command extracting section, interpreting section)
1028: Sheet sensors
1029: Display panel (notifying section)
1029a: Clear button (selecting section)
1050: Sheet storage unit
200: Network (communication line)
T: sheet feeding devices 1-3
B: Internal bus
E: Printer engine (printing section)
PC: Information processing apparatus
500: Display (notifying section)
501: Transmission device (transmitting section)

2021: CPU (controller, computing section)
2022: Input/output interface (input/output I/F; transmitting section)
M: Display monitor (notifying section)

DETAILED DESCRIPTION

An exemplary embodiment of the present invention will be hereinafter described in detail with reference to the drawings. The same components are given a common symbol in the accompanying drawings and will not be described redundantly. The following description will be directed to the best mode for carrying out the invention, and hence the invention is not limited to it.

A printer as an image forming apparatus according to an exemplary embodiment may be any of various kinds of printers such as a laser printer, a full-color printer, and an ink-jet printer. Although the embodiment is directed to the printer as an image processing apparatus, the image forming apparatus according to the invention is not limited to printers and includes facsimile machines etc.

The configuration of a control system of a printer 100 according to the embodiment will be described below with reference to FIG. 1.

A printer control unit 102 which serves as an image processing apparatus in the printer 100 includes the following components which are connected to each other via an internal bus B. The components are a CPU 1021 which performs various kinds of computation processing such as generation of image information and other processing on the basis of print information, an input interface (input I/F) 1022 which is one form of receiving section for receiving print information etc. from, for example, a host computer PC as an externally connected information processing apparatus, a RAM 1023 which temporarily stores print information and also functions as a work area for computation processing, a ROM 1024 which stores programs for execution of a print control process and other processes, various data, etc., a PDL processing device 1025 as one form of control command extracting section which performs processing according to a page-description language (PDL) and extracts a first control command and a second control command contained in print information and other section, a printer engine interface (printer engine I/F) 1027 which exchanges control information etc. with a printer engine E as one form of printing section for performing printing, sheet sensors 1028 which detect whether or not print sheets as print recording media exist in sheet feeding devices (trays) 1-3 (T) of a sheet storage unit 1050, and a display panel 1029 as a notifying section for displaying an error message etc.

Examples of the page-description language (PDL) are PCL (e.g., PCLXL, PCL5, PCL6, etc.: trademarks of Hewlett-Packard Company), PostScript (trademark of Adobe Systems Incorporated), LIPS (trademark of Canon Inc.), ESC/Page (trademark of Seiko Epson Corporation), and PRESCRIBE (trademark of Kyocera Corp.).

If the printer 100 according to the embodiment is a laser printer, for example, the printer engine E means all of the mechanisms which perform printing actually such as a laser driver, a semiconductor laser, and an electrostatic drum.

The CPU 1021 may be a one-chip microcomputer or the like.

The CPU 1021 also serves as a generating section for generating control information for a control of prohibiting execution of one of processing based on a first control command and processing based on a second control command.

In the embodiment of FIG. 1, the input interface 1022 is connected to the host computer PC or the like incorporating printer drivers via a network 200 (a communication line such as a LAN). The manner of connection between the printer 100 and the host computer PC or the like is not limited to the method using the network 200, and includes a case that the printer 100 is connected to a personal computer or the like one to one via a printer cable or the like. Although this embodiment employs the network 200 (e.g., a LAN) as an exemplary communication section, other communication section may be used.

Figure 14:
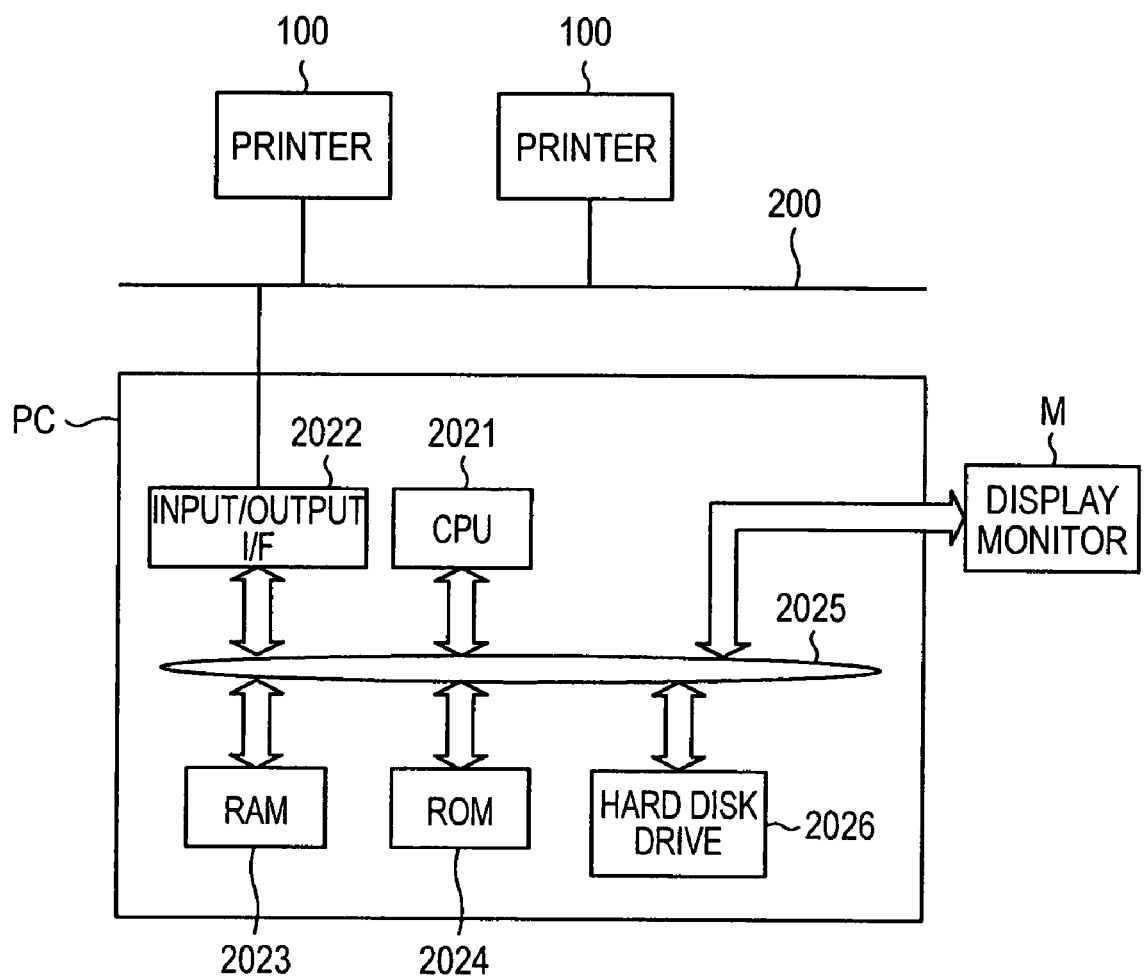
FIG. 14 is a block diagram showing the configuration of an information processing apparatus.

A general configuration of the host computer PC as the information processing apparatus will now be described with reference to a block diagram of FIG. 14.

The information processing apparatus PC is composed of the following components which are connected to each other via an internal bus 2025. The components are a CPU 2021 which performs various kinds of computation processing and other processing, an input/output interface 2022 (input/output interface; e.g., LAN interface) as a transmitting section which performs input/output of print information etc. with one or more externally connected printers 100, a RAM 2023 which temporarily stores generated print information and also functions as a work area for computation processing, a ROM 2024 which stores microprograms such as a BIOS, a hard disk drive 2026 which stores an OS, various applications, and various data, and a display monitor M (e.g., liquid crystal monitor) which displays manipulation pictures of the various applications, an error message, etc. Installed in the hard disk drive 2025, printer drivers control operation of the respective printers 100.

Next, a control process of a first example which is executed by the printer control unit 102 of the printer 100 according to the embodiment will be described with reference to FIGS. 2-6.

First, a print control process will be described with reference to a flowchart of FIG. 2.

Upon a start of the print control process, at step S10, print information is received from the host computer PC or the like via the input interface 1022. Then, the process moves to step S11.

At step S11, the CPU 1021 parses the print information and acquires control commands. More specifically, the CPU 1021 extracts a first control command indicating a print setting and a second control command indicating a print setting that is different than indicated by the first control command.

In this embodiment, the first control command section an ordinary command that is located at a head portion of a document, is described in a printer job control language (PJL), and designates a prescribed print sheet, for example. The second control command section a passthrough command that was embedded in a document at a certain position by a person who generated the document or some other person using a page-description language and serves for passthrough processing for designation of a particular sheet, for example.

The passthrough function will now be described.

For example, Windows which is an operating system (OS) of Microsoft Corporation, Word (trademark of Microsoft Corporation) which is word processor software that runs on this OS, etc. have, as one of application functions, a passthrough function (passthrough command processing function).

For example, an application can pass data to a printer (printing apparatus) using an API Escape( ) function which is a passthrough command. Where a printer driver supports passthrough printer escape (hereinafter referred to simply as "passthrough"), a native printer language code (e.g., native PCL code) can be transmitted to the printer driver by using the Escape( ) function and the passthrough.

In Windows, the above-mentioned Escape( ) function is provided to support functions specific to a printer that cannot be completely supported by image drawing functions of GDI (graphic device interface; this is one of programs provided in Windows and serves to control a printer and a display). The passthrough which is a function for outputting a printer code to a printer exists in it.

The passthrough has a function of permitting transmission of data to a printer in the case where an application is not using a standard printer driver. That is, data of a spool file image (printer control code image) can be generated inside an application and output to a printer by using the passthrough function.

More specifically, it is possible to insert a print field into the text of a document generated by Word, for example, and transmit a prescribed command to a printer. The command is transmitted to the printer as a native printer language code.

For example, when data is embedded in a particular field in a document, that field is not image-drawn and embedded, as passthrough data, in a print file (print information) which will be transmitted to a printer.

The specification is such that if a graph, a formula, or the like is embedded in a document or data generated by another application is inserted into a document (i.e., embedding of an object), the inserted data is made part of the document. And if the object is altered, the document comes to reflect the alteration.

Native printer language codes (mentioned above) are executed in order of their insertion positions in a document.

Returning to FIG. 2, at step S12, it is judged whether or not a passthrough command (second control command) exists. If it is judged that a passthrough command does not exist, the process moves to step S13, where processing is performed according to a first control command. More specifically, for example, if the first control command designates the print sheet A4 and "punching" or "stapling" as post-processing, these pieces of processing are performed. Then, the process moves to step S14, where it is judged whether or not all pages of the print information have been processed. If the judgment result is "no," the process returns to step S10 and continues to be executed. If the judgment result is "yes," the process is finished.

On the other hand, if it is judged at step S12 that a passthrough command exists, the process moves to step S15 (a subroutine of passthrough processing).

Next, the processing procedure of the subroutine of the passthrough process will be described with reference to a flowchart of FIG. 3.

At step S1501, the size of a passthrough block is detected. More specifically, the size (in bytes) of a portion of the document for which processing of a passthrough command is designated is detected and acquired.

At step S1502, the read-in size is reset to "0." Then, the process moves to step S1503.

At step S1503, it is judged whether or not the reading size is smaller than the block size. If the judgment result is "no," it is judged that the whole passthrough block has been processed and the passthrough process is finished. The process returns to step S14 (see FIG. 2). If the judgment result is "yes," the process moves to step S1504, where the contents of the passthrough command (second control command) are read. Then, the process moves to step S1505, where the read-in size is updated (addition is performed). Then, the process moves to step S1506.

At step S1506, it is judged whether or not the passthrough command (second control command) contains, as a command for a first process, a sheet designation command (for execution of sheet designation). If the judgment result is "no," processing S1507 according to the passthrough command is performed. Then, the process returns to step S1503.

On the other hand, it the judgment result is "yes," the process moves to step S1508, where a subroutine of a passthrough sheet selection process as a second process is executed.

Next, the processing procedure of the subroutine of the passthrough sheet selection process will be described with reference to a flowchart of FIG. 4.

At step S1600, it is judged whether or not a sheet that is designated by the sheet designation command of the passthrough command exists in the sheet feeding devices T of the sheet storage unit 1050. More specifically, the storage statuses of print sheets of different sizes in the sheet feeding devices 1-3 are detected by the sheet sensors 1028 and whether or not the designated sheet exists is judged on the basis of the detection results. In this embodiment, it is assumed that print sheets of "A4/vertical" are set in the sheet feeding device 1, print sheets of "B5/vertical" are set in the sheet feeding device 2, and print sheets of "B4/horizontal" are set in the sheet feeding device 3.

If it is judged at step S1600 that no designated sheet exists, the process moves to step S1601, where the original sheet (i.e., a print sheet designated by the first control command) is selected disregarding the sheet designation command of the passthrough command. Then, the process returns to step S1503 (see FIG. 3).

On the other hand, if it is judged at step S1600 that the designated sheet exists, the process moves to step S1602, where it is judged whether or not there is designation with a prohibition condition. The term "prohibition condition" means a predetermined condition indicating a prohibited combination of a print sheet size and print processing or post-processing. Exemplary prohibited combinations of a print sheet size and print processing or post-processing (prohibition conditions) are a prohibited combination of the B5 size and punching and a prohibited combination of a size smaller than A3 and folding into three sections.

The term "designation with a prohibition condition" means designation of processing as mentioned above whose execution may be prohibited depending on the sheet size, such as punching or folding into three sections.

If it is judged at step S1602 that there is no designation with a prohibition condition, the process moves to step S1604, where the sheet designated by the passthrough command is selected. Then, the process returns to step S1503 (see FIG. 3).

On the other hand, if it is judged at step S1602 that there is designation with a prohibition condition, the process moves to step S1603, where it is judged whether or not the designated sheet size is compatible with the designation with a prohibition condition. If it is judged that the designated sheet size is compatible with the designation with a prohibition condition (e.g., if the designated sheet size is not B5, the designation of punching is compatible with the sheet size and hence punching can be performed on the designated sheet), the process moves to step S1604. At step S1604, the sheet designated by the passthrough command is selected. Then, the process returns to step S1503 (see FIG. 3).

If it is judged at step S1603 that the designated sheet size is not compatible with the designation with a prohibition condition (e.g., if the designated sheet size is B5, the designation of punching is not compatible with the sheet size and hence punching cannot be performed on the designated sheet), the process moves to step S1601. At step S1601, the original sheet (i.e., the print sheet designated by the first control command) is selected disregarding the sheet designation command of the passthrough command. Then, the process returns to step S1503 (see FIG. 3).

Figure 4:
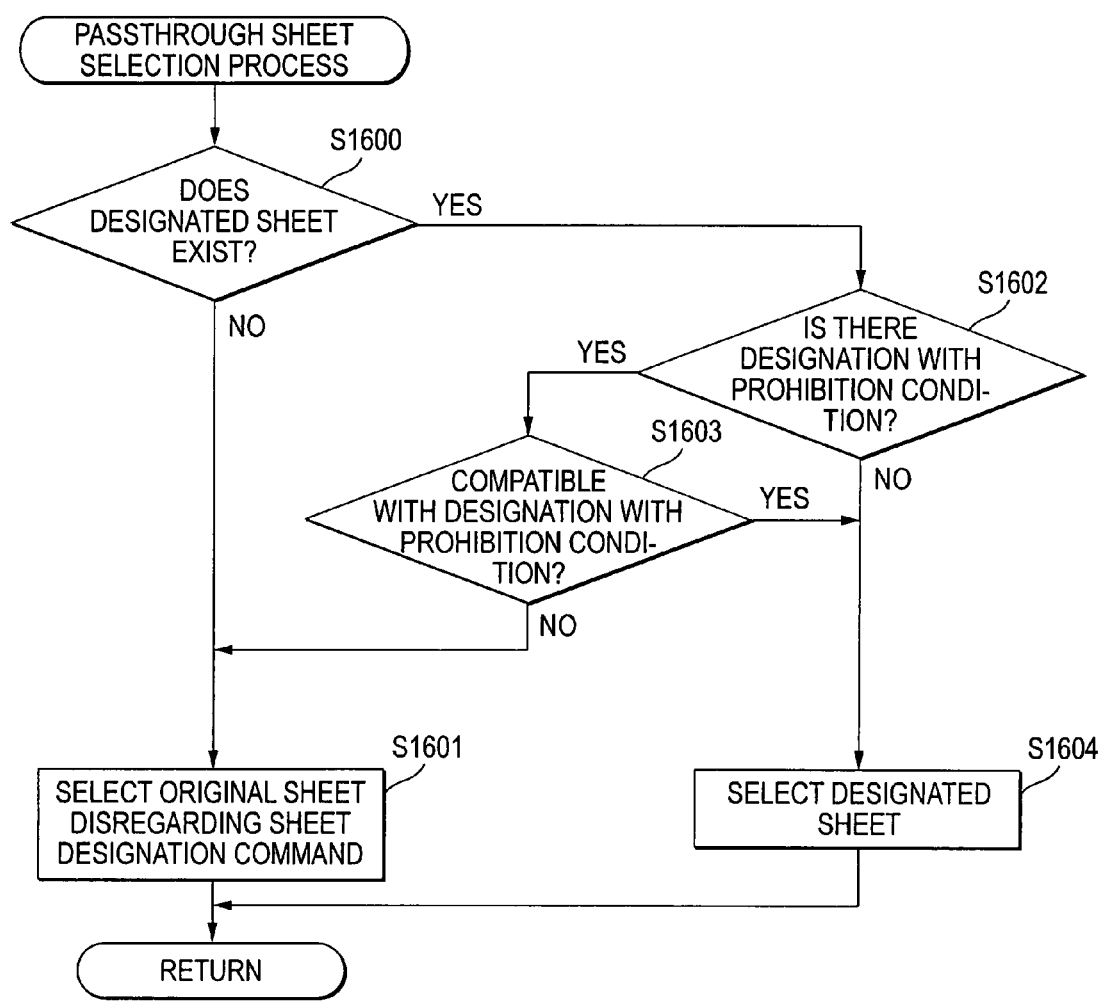
FIG. 4 is a flowchart showing the processing procedure of a subroutine of a passthrough sheet selection process of a first exemplary embodiment.
Figure 5:
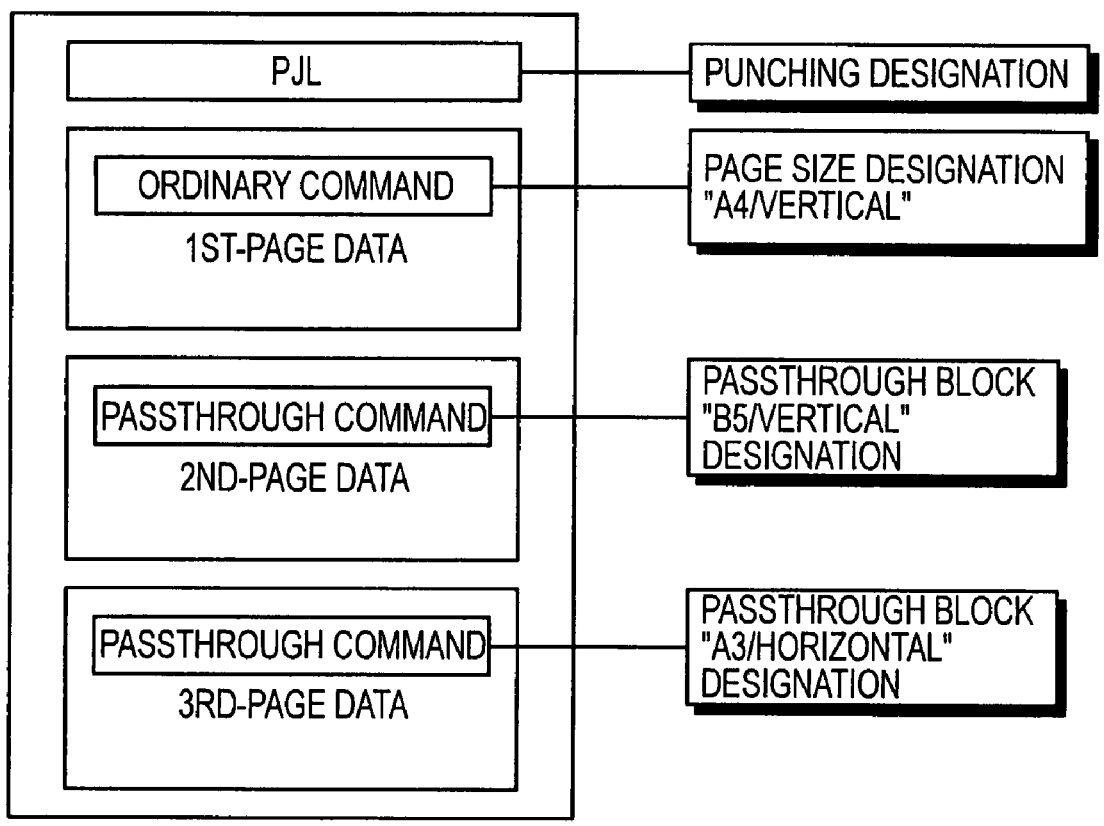
FIG. 5 is an explanatory diagram showing sample data of print information.

Now, an output result that is produced when print information (sample data) having a structure shown in FIG. 5 is processed according to the print control process of FIGS. 2-4 will be described with reference to FIG. 6.

In the print information of FIG. 5 which is of a document of three pages in total, a first control command "punching designation" is written in a printer job control language (PJL) at the head of the document as a control command directed to all the pages. Page size designation "A4/vertical" (ordinary command) is written on the first page. On the second page, a passthrough block is set and "B5/vertical" is designated as a passthrough command in a page-description language such as PCL5. On the third page, a passthrough block is set and "A3/horizontal" is designated as a passthrough command in a page-description language such as PCL5.

Figure 2:
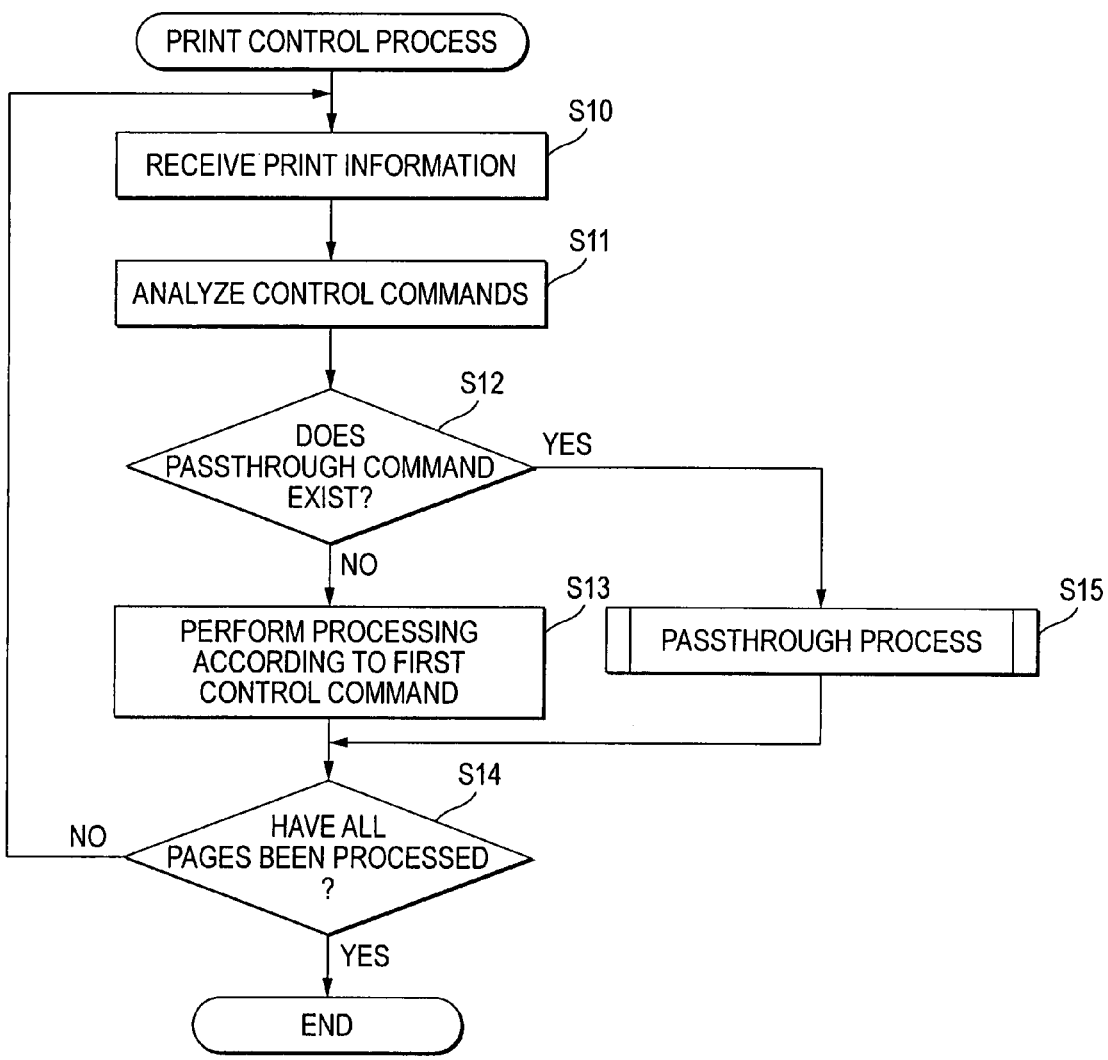
FIG. 2 is a flowchart showing the processing procedure of a print control process.
Figure 3:
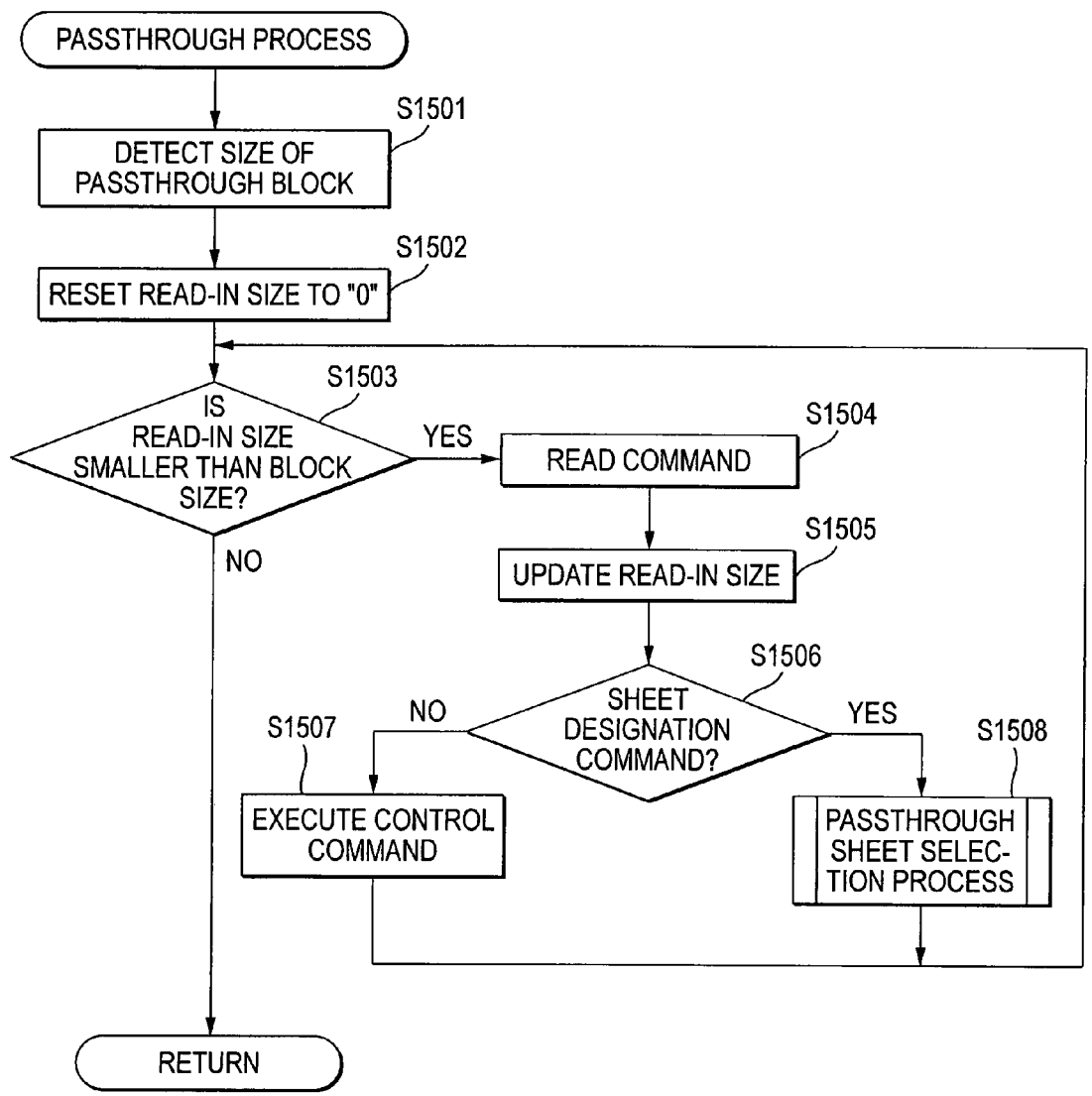
FIG. 3 is a flowchart showing the processing procedure of a subroutine of a passthrough process.
Figure 6A:
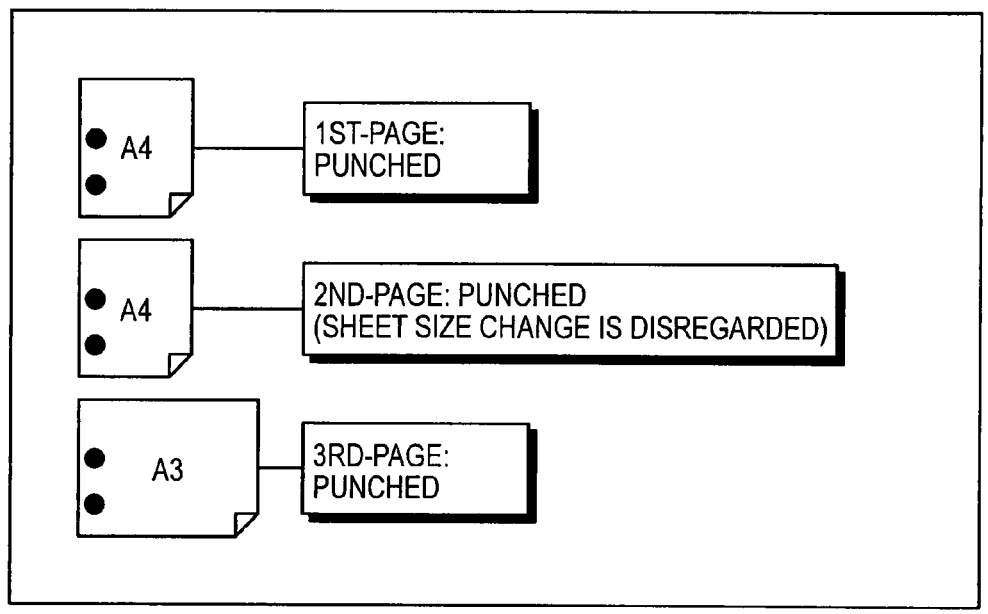
FIGS. 6A and 6B are explanatory diagrams showing examples of output results.

When the print information of FIG. 5 is processed according to the print control process of FIGS. 2-4, an output result of FIG. 6A is obtained. That is, an "A4/vertical" sheet as the first page is punched according to the print information of FIG. 5. An "A4/vertical" sheet as the second page is punched according to the ordinary command disregarding the passthrough command for changing the sheet size in the print information of FIG. 5. An "A3/horizontal" sheet as the third page is punched according to the print information of FIG. 5.

Figure 6B:
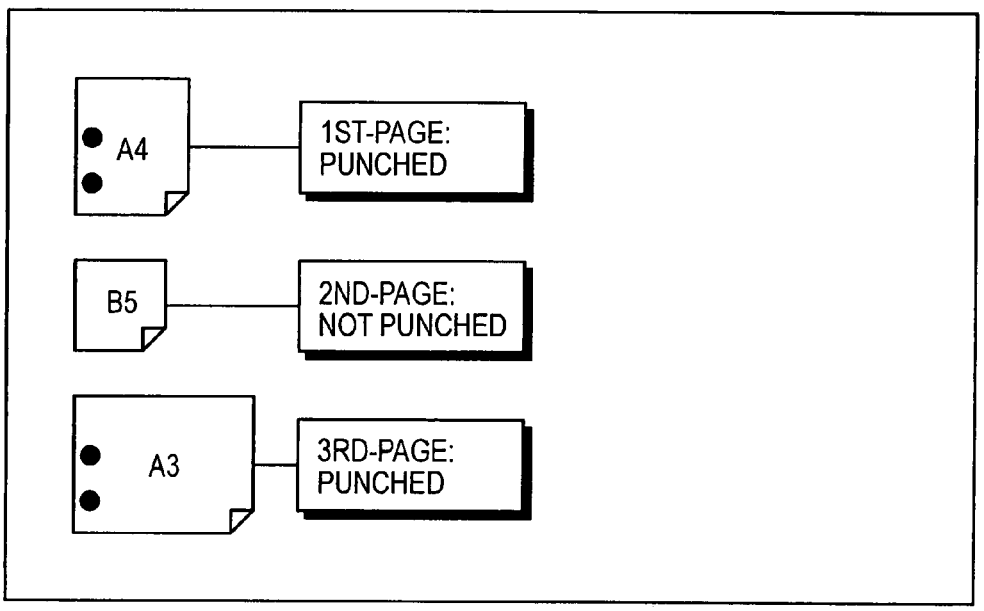

FIG. 6B shows an output result which is obtained when the print control process of FIGS. 2-4 according to the embodiment is not applied. A "B5/vertical" sheet is used as the second page according to the print information of FIG. 5, but punching is canceled.

Next, a control process of a second example which is executed by the printer control unit 102 of the printer 100 according to the embodiment will be described with reference to FIGS. 2, 3, and 7-12.

The print control process and the subroutine of the passthrough process are the same as those of the flowcharts of FIGS. 2 and 3 and hence will not be described redundantly.

Figure 7:
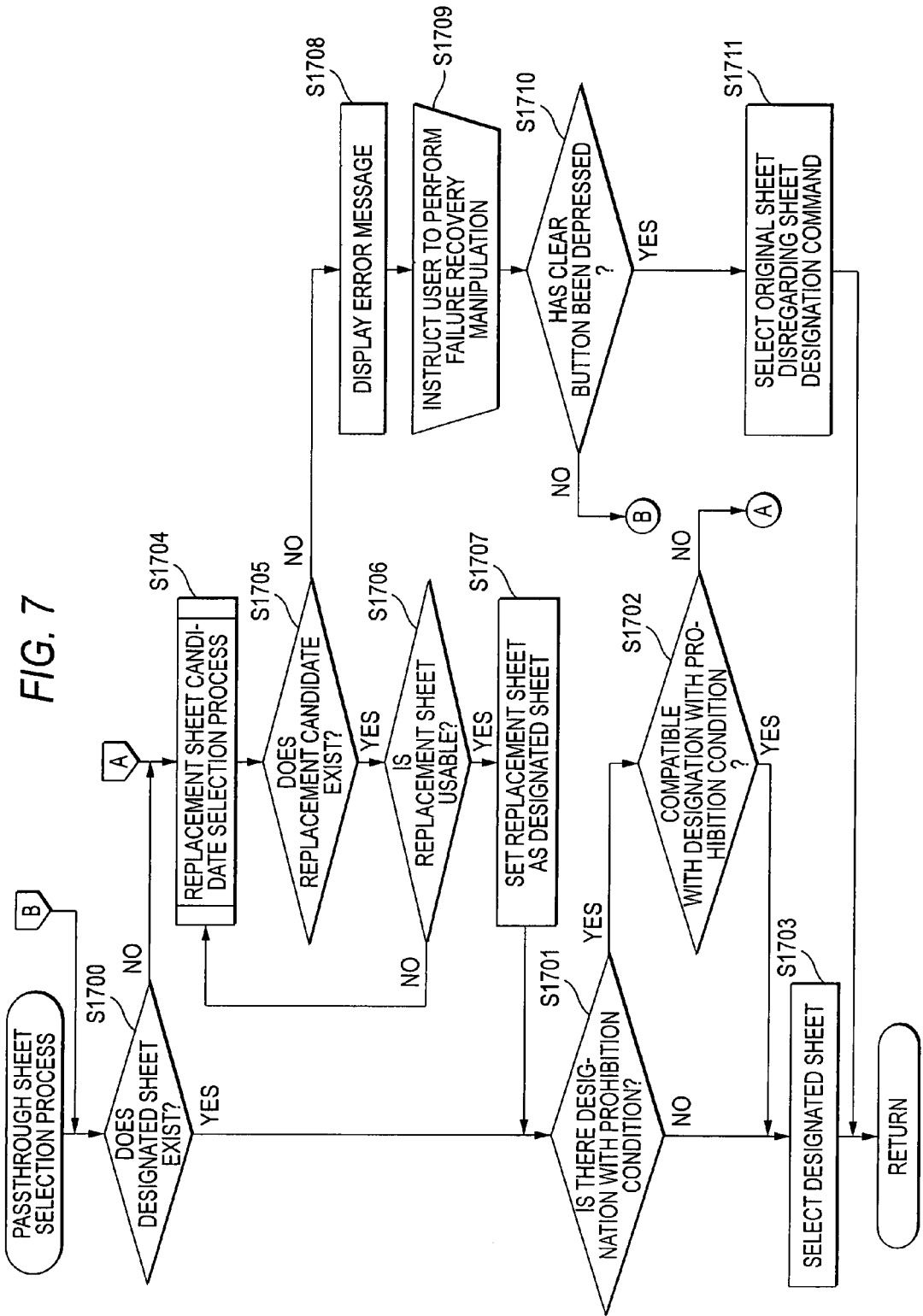
FIG. 7 is a flowchart showing the processing procedure of a subroutine of a passthrough sheet selection process of a second exemplary embodiment.

The processing procedure of the subroutine of the passthrough sheet selection process (step S1508) is as shown in a flowchart of FIG. 7.

Upon a start of the passthrough sheet selection process, it is judged at step S1700 whether or not a sheet that is designated by the sheet designation command of the passthrough command exists in the sheet feeding devices T of the sheet storage unit 1050. More specifically, the storage statuses of print sheets of different sizes in the sheet feeding devices 1-3 are detected by the sheet sensors 1028 and whether or not the designated sheet exists is judged on the basis of the detection results. In this embodiment, as mentioned above, it is assumed that print sheets of "A4/vertical" are set in the sheet feeding device 1, print sheets of "B5/vertical" are set in the sheet feeding device 2, and print sheets of "B4/horizontal" are set in the sheet feeding device 3.

If it is judged at step S1700 that no designated sheet exists, the process moves to step S1704, where a subroutine of a replacement sheet candidate selection process is executed.

The term "replacement sheet candidate selection process" means a process for selecting, according to priority order, a print sheet (replacement sheet) whose size is close to a size intended by a person who generated a document or some other person.

On the other hand, if it is judged at step S1700 that the designated sheet exists, the process moves to step S1701, where it is judged whether or not there is designation with a prohibition condition. As described above, the term "prohibition condition" means a predetermined condition indicating a prohibited combination of a print sheet size and print processing or post-processing. Exemplary prohibited combinations of a print sheet size and print processing or post-processing (prohibition conditions) are a prohibited combination of a "B5/vertical" or "B4/horizontal" and stapling and a prohibited combination of a size smaller than A3 and folding into three sections. The term "designation with a prohibition condition" means designation of processing as mentioned above whose execution may be prohibited depending on the sheet size, such as stapling or folding into three sections.

If it is judged at step S1701 that there is no designation with a prohibition condition, the process moves to step S1703, where the sheet designated by the passthrough command is selected. Then, the process returns to step S1503 (see FIG. 3).

On the other hand, if it is judged at step S1701 that there is designation with a prohibition condition, the process moves to step S1702, where it is judged whether or not the designated sheet size is compatible with the designation with a prohibition condition. If it is judged that the designated sheet size is compatible with the designation with a prohibition condition (e.g., if the sheet size is not "B5/vertical," the designation of stapling is compatible with the sheet size and hence stapling can be performed on the designated sheet), the process moves to step S1703. At step S1703, the sheet designated by the passthrough command is selected. Then, the process returns to step S1503 (see FIG. 3).

If it is judged at step S1702 that the designated sheet size is not compatible with the designation with a prohibition condition (e.g., if the sheet size is B5, the designation of punching is not compatible with the sheet size and hence punching cannot be performed on the designated sheet), the process moves to step S1704. At step S1704, the subroutine of the replacement sheet candidate selection process is executed.

Now, the processing procedure of the subroutine of the replacement sheet candidate selection process will be described with reference to a flowchart of FIG. 8.

Figure 9:
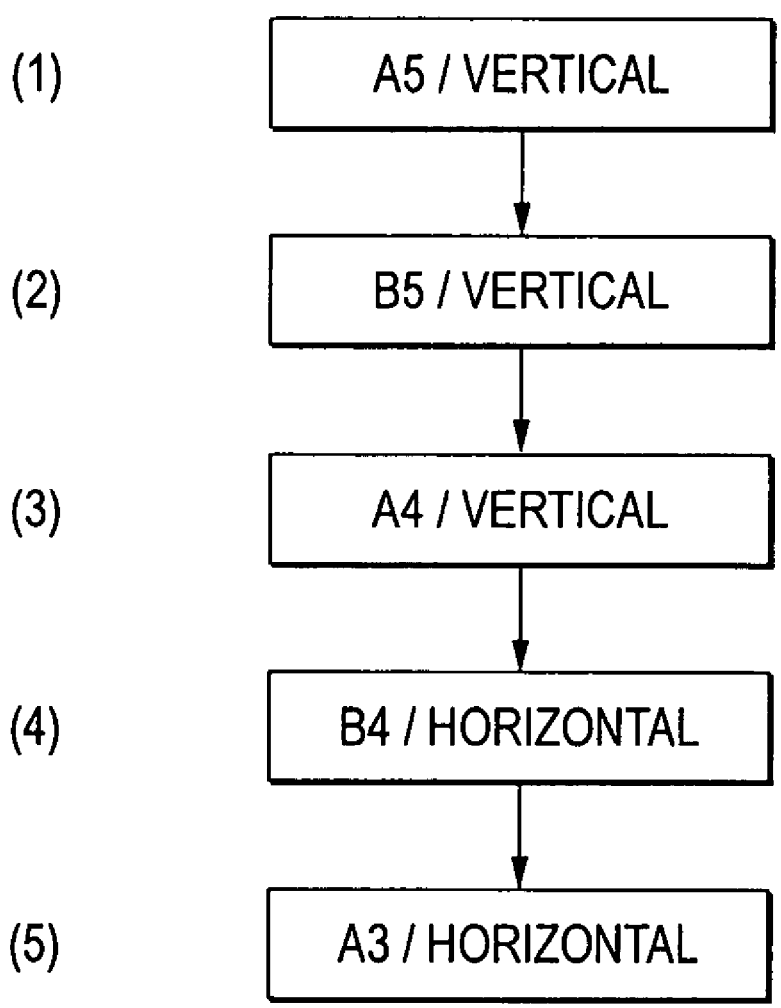
FIG. 9 is an explanatory diagram showing an example of priority order of replacement sheets.

As shown in FIG. 9, for example, it is predetermined that replacement sheet candidates "A5/vertical", "B5/vertical," "A4/vertical," "B4/horizontal", and "A3/horizontal" (their size increases gradually in this order) are given selection priority ranks (1)-(5), respectively.

Upon a start of the replacement sheet candidate selection process, it is judged at step S1800 whether or not there exists a sheet that is largest in size next to the designated sheet. For example, if "A4/vertical" is designated by the passthrough command, it is judged, according to the priority order, whether or not there exists a "B4/horizontal" sheet which is next largest.

If the judgment result of step S1800 is "no," "no replacement sheet" is set at step S1802. Then, the process returns to step S1705 (see FIG. 7).

On the other hand, if the judgment result of step S1800 is "yes," the process moves to step S1801, where the sheet (in the above example, "B4 horizontal" sheet) that is largest next to the designated sheet is set as a replacement candidate. Then, the process returns to step S1705 (see FIG. 7).

Returning to FIG. 7, it is judged at step S1705 whether or not a replacement candidate exists. If the judgment result is "yes," the process moves to step S1706, where it is judged whether or not the replacement sheet is usable. If the replacement sheet is usable, the process moves to step S1701 via step S1707 to execute step S1707 and the following steps again. If it is judged that the replacement sheet is not usable, the process returns to step S1704 to execute the replacement sheet candidate selection process again.

Figure 10A:
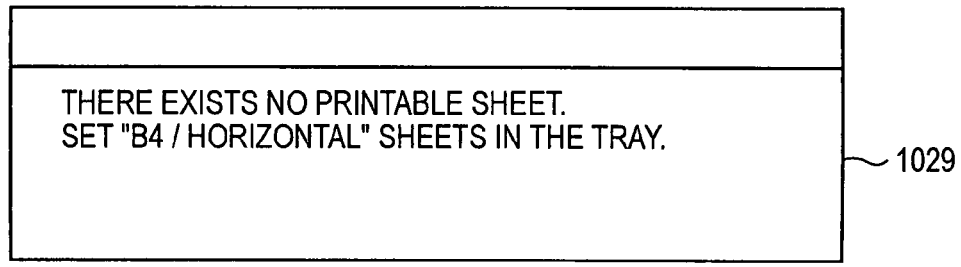
FIGS. 10A and 10B are explanatory diagrams showing display examples of error messages.

On the other hand, if it is judged at step S1705 that no replacement candidate exists, the process moves to step S1708, where an error message is displayed on the display panel 1029. Then, the process moves to step S1709. For example, as shown in FIG. 10A, sentences such as "There exists no printable sheet. Set "B4/horizontal" sheets in the sheet feeding device." are displayed on the display panel 1029 which is a liquid crystal display or the like.

When the error message as shown in FIG. 10A is displayed, the process may be finished immediately and return to step S1503 (see FIG. 3).

Instead of the error message shown in FIG. 10A, sentences such as "There exists no printable sheet. Perform one of the following manipulations:

(1) Set "A4/horizontal" sheets in the sheet feeding device.

(2) Push the clear (C) button and perform printing on an "A4/vertical" sheet."may be displayed on the display panel 1029 which is a liquid crystal display or the like to instruct the user to perform a failure recovery manipulation (step S1709). In this case, a clear button (selecting section) 1029a is provided at the top-right corner, for example, of the display panel 1029.

It is judged at step S1710 whether or not the clear button has been depressed. If it has been depressed, the process moves to step S1711, where the original sheet (in the above example, the "A4/vertical" sheet) is selected disregarding the sheet designation of the passthrough command. Then, the process returns to step S1503 (see FIG. 3).

On the other hand, if it is judged at step S1710 that the clear button has not been depressed, the process returns to step S1700 after a lapse of a prescribed time to execute it and the following steps again.

Figure 11:
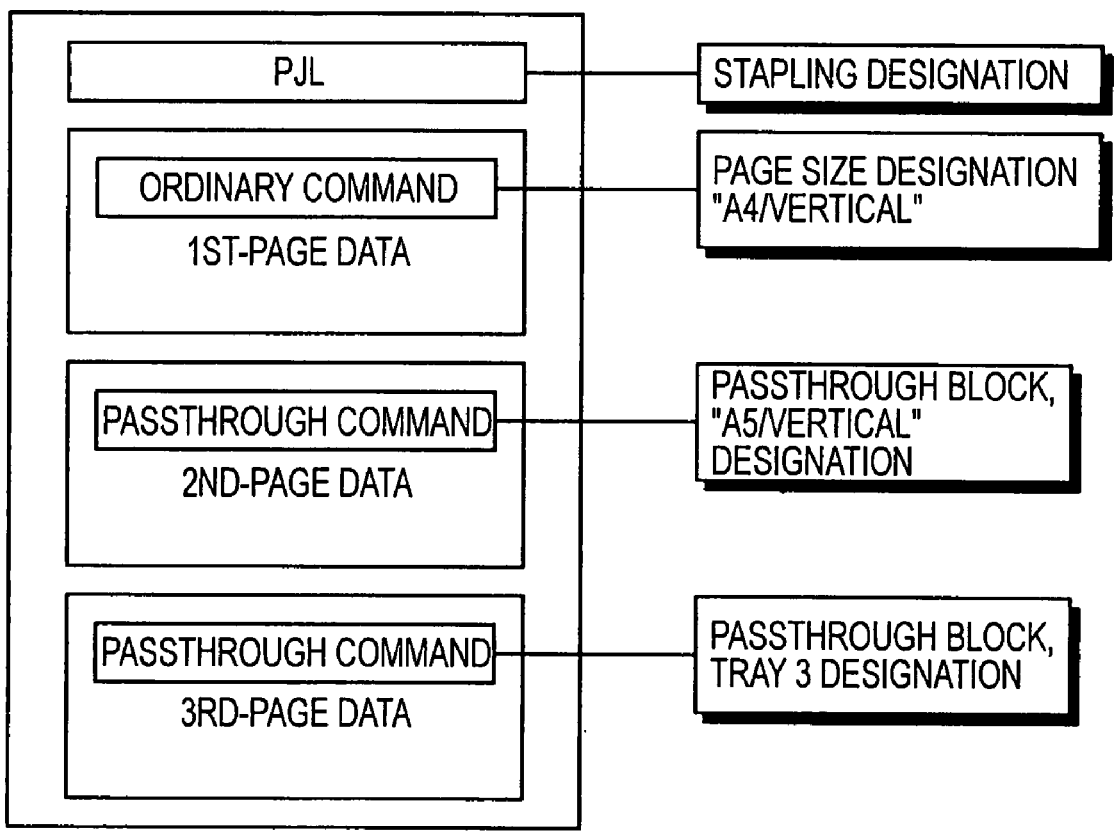
FIG. 11 is an explanatory diagram showing sample data of print information.

Now, output results that are produced when print information (sample data) having a structure shown in FIG. 11 is processed according to the print control process of FIGS. 2, 3, 7, and 8 will be described with reference to FIG. 12.

In the print information of FIG. 11 which is of a document of three pages in total, a first control command "stapling designation" is written in a printer job control language (PJL) at the head of the document as a control command directed to all the pages. Page size designation "A4/vertical" (ordinary command) is written on the first page. On the second page, a passthrough block is set and "A5/vertical" is designated as a passthrough command in a page-description language such as PCL5. On the third page, a passthrough block is set and the sheet feeding device 3 is designated as a passthrough command in a page-description language such as PCL5. In this embodiment, "B4/horizontal" sheets are contained in the sheet feeding device 3.

Figure 12A:
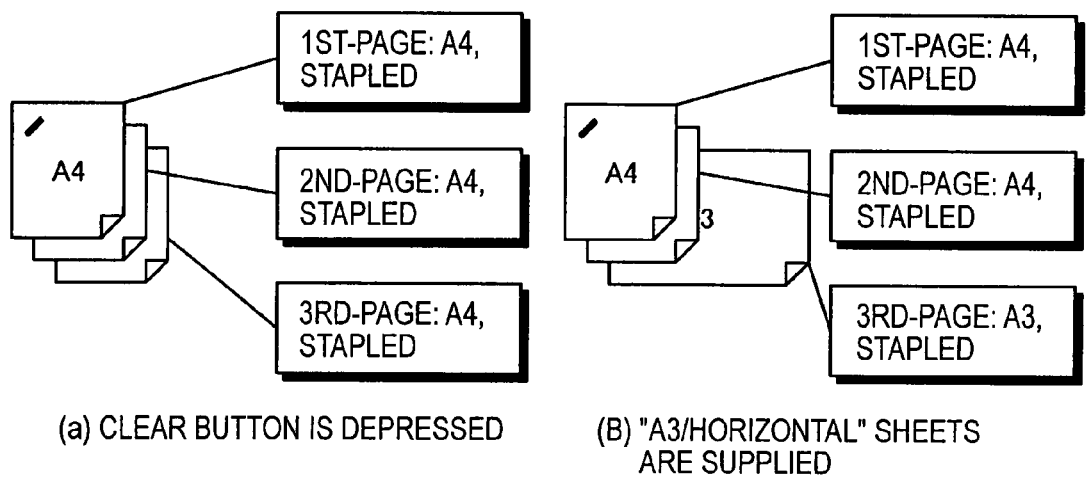
FIGS. 12A and 12B are explanatory diagrams showing examples of output results.

When the print information of FIG. 11 is processed according to the print control process of FIGS. 2, 3, 7, and 8, an output result of FIG. 12A is obtained.

That is, the first page is processed in the specified manner. As for the second page, since no "A5/vertical" sheet exists in the sheet feeding devices 1-3, the "B5/vertical" sheet is selected according to the replacement sheet candidate selection process of FIG. 8. However, since it is judged that the "B5/vertical" sheet cannot be stapled at step S1702 (see FIG. 7) for judging compatibility with the designation with a prohibition condition, the replacement sheet candidate selection process is executed again. The "A4/vertical" sheet is selected finally as shown in FIGS. 12A-(a) and (b) and stapling is performed.

Figure 8:
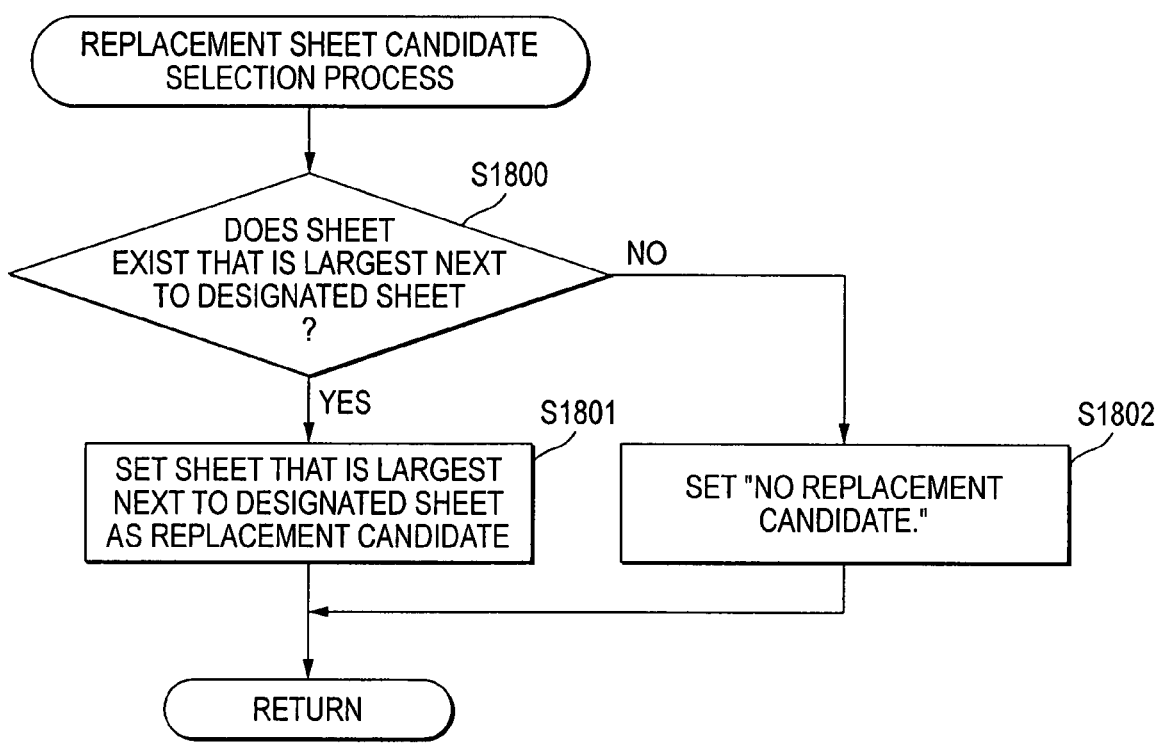
FIG. 8 is a flowchart showing the processing procedure of a subroutine of a replacement sheet candidate selection process.
Figure 10B:
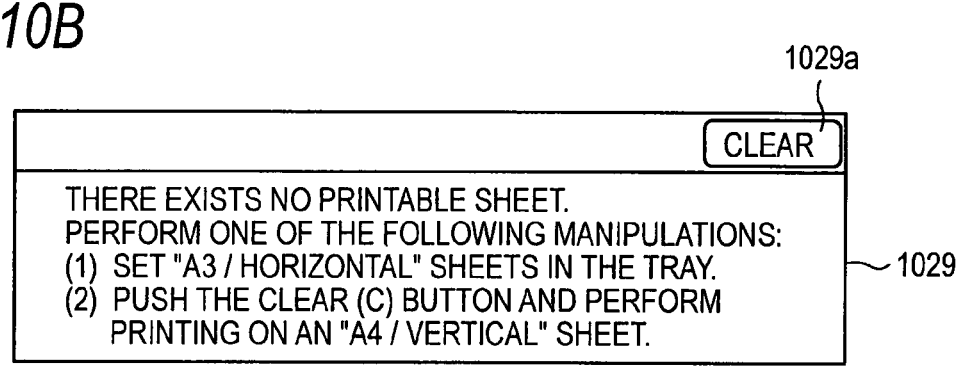

As for the third page, although "B4/horizontal" is designated ("B4/horizontal" sheets are contained in the sheet feeding device 3), since step S1702 (see FIG. 7) for judging compatibility with the designation with a prohibition condition produces a judgment result that "B4/horizontal" sheets cannot be stapled, the "A3/horizontal" sheet is selected by the replacement sheet candidate selection process of FIG. 8. However, in this embodiment no "A3/horizontal" sheet is contained in the sheet feeding devices 1-3, the error message shown in FIG. 10B is displayed at step S1708 (see FIG. 7).

If the user pushes the clear button 1029a according to item (2) of the error message, the sheet designation of the passthrough command is disregarded at step S1711 (see FIG. 7). A sheet of the original sheet size (i.e., "A4/vertical" which is designated by the ordinary command on the first page) is used and stapling is performed. A processing result is as shown in FIG. 12(A)-(a).

On the other hand, if "A3/horizontal" sheets are set in the sheet feeding device T according to item (1) of the error message, a sheet of the sheet size "A3/horizontal" that is selected as a replacement is used and stapling is performed. A processing result is as shown in FIG. 12A-(b).

Figure 12B:
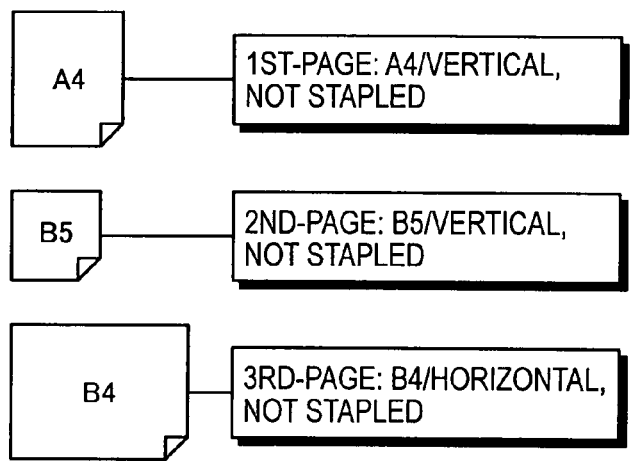

FIG. 12B shows an output result which is obtained when the print control process of FIGS. 2, 3, 7, and 8 according to the embodiment is not applied. A "B5/vertical" sheet is used as the second page but punching is canceled for all the three pages.

The invention has been described above in a specific manner in the form of the embodiment. However, it should be understood that the embodiment disclosed in this specification is just an example in every point and hence the invention is not limited to the disclosed techniques. That is, the technical scope of the invention should not be construed restrictively on the basis of the embodiment. The invention encompasses techniques that are equivalent to the techniques as well as all modifications made within the scope of the invention.

For example, although in the embodiment the control command extracting section etc. are formed by the devices and the programs on the image processing apparatus (printer 100) side, it is conceivable to implement all or part of the functions by an external apparatus (e.g., a personal computer that is connected to the image processing apparatus).

Where a program is used, it can be provided over a network or provided so as to be stored in a recording medium such as a CD-ROM.

Although in the embodiment the printer 100 is equipped with the display panel 1029, the invention is not limited to such a case and encompasses a case that necessary information is displayed on the information processing apparatus PC such as a personal computer.

Now, with reference to FIG. 13, a description will be made of a configuration that is employed in the case where necessary information is displayed on and a manipulation is performed through the information processing apparatus PC.

Components having corresponding components in FIG. 1 will be given the same symbols as the latter and will not be described redundantly.

Figure 13:
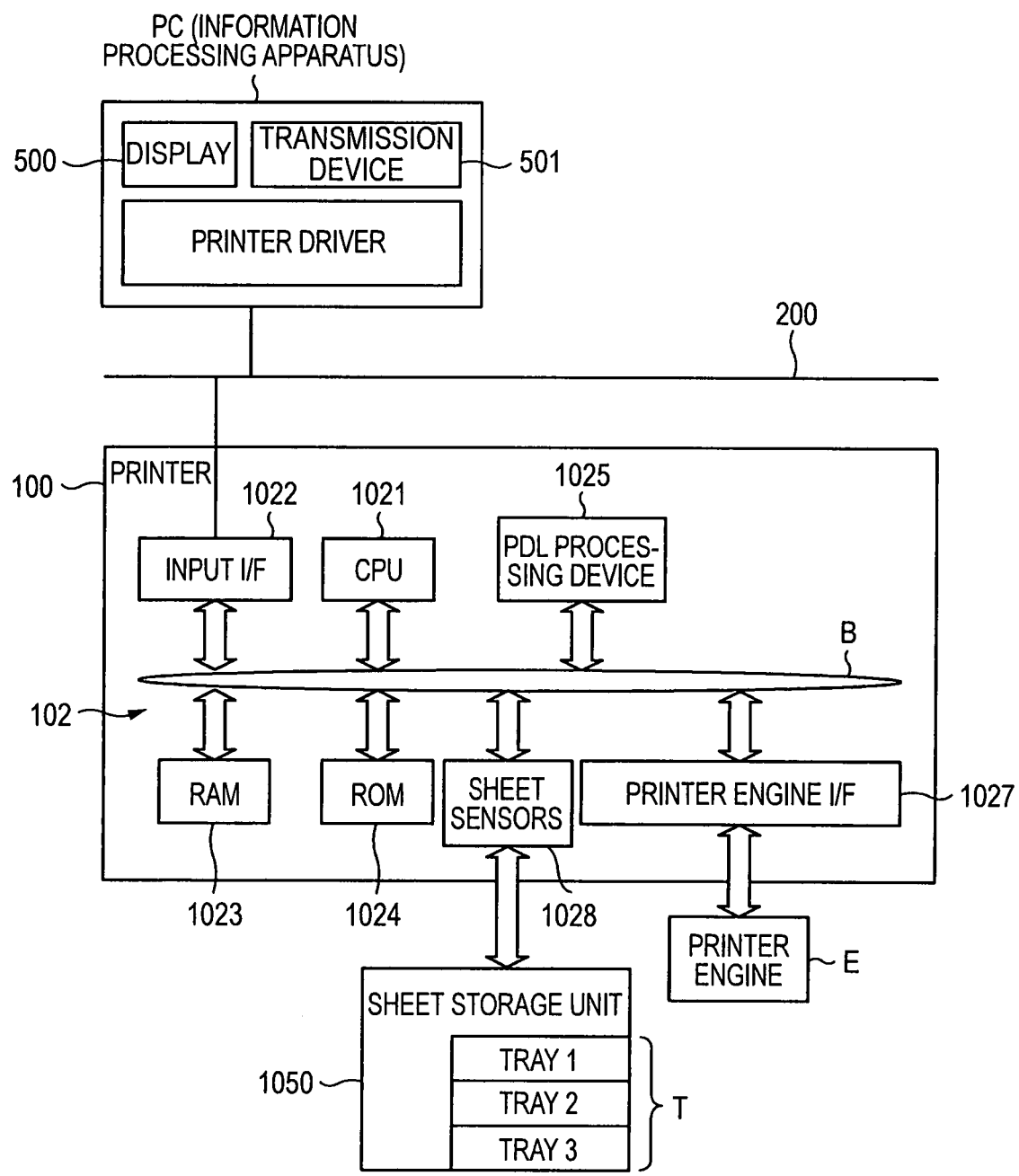
FIG. 13 is a block diagram showing the configuration of a control system of a printer according to another exemplary embodiment.

The configuration of FIG. 13 is different from that of FIG. 1 in that the information processing apparatus PC is provided with, in addition to the printer drivers, a display 500 such as a touch-type liquid crystal panel and a transmission device (transmitting section) 501 such as a modem. Instead of providing the display 500, it is possible to display necessary information on a monitor for a personal computer and to perform a manipulation on the clear button and other manipulations using a keyboard and a pointing device such as a mouse that are connected to the personal computer.

The image processing apparatus according to the invention can be applied to laser printers, full-color printers, ink-jet printers, facsimile machines, etc.

What is claimed is:

1. An image processing system comprising:
a receiving section that receives print information including at least a first control command indicating a first print setting and a second control command embedded in a document to be printed and indicating a second print setting;
an interpreting section that interprets the first control command and the second control command; and
a controller that performs a control so as to prohibit execution of processing based on one of the first control command and the second control command when the interpreting section determines that both of the first control command and the second control command cannot be concurrently executed based on a print recording medium designated by at least one of the control commands.

2. The image processing system according to claim 1, wherein the controller performs a control so as to prohibit execution of processing based on the second control command when the interpreting section determines that both of the first control command and the second control command cannot be concurrently executed.

3. The image processing system according to claim 2, further comprising a notifying section that causes notification of a situation that processing based on the first control command cannot be executed when the situation occurs.

4. The image processing system according to claim 1, wherein the controller performs a control so as to execute processing based on both of the first control command and the second control command when the interpreting section determines that both of the first control command and the second control command can be concurrently executed.

5. The image processing system according to claim 1, wherein one of the first control command and the second control command designates at least the print recording medium and the other of the first control command and the second control command designates at least post-processing.

6. The image processing system according to claim 5, further comprising a judging section that make a judgment as to whether there exists the designated print recording medium,
wherein when the judging section make a judgment that the designated print recording medium does not exist, the controller selects a different print recording medium according to a priority order, the post-processing being executed to the selected print recording medium.

7. The image processing system according to claim 1, wherein the second print setting can be set for each page of the document.

8. The image processing system according to claim 1, wherein the first print setting can be set for the document.

9. An image forming system comprising:
an image processing system, according claim 1; and
a printing section that performs printing under a control of the image processing system.

10. An image forming system comprising:
one or more image forming apparatuses according to claim 9; and
one or more information processing apparatuses connected to the one or more image forming apparatuses via a communication circuit.

11. A method for image processing, comprising:
receiving print information including at least a first control command indicating a first print setting and a second control command embedded in a document to be printed and indicating a second print setting;
interpreting the first control command and the second control command; and
performing a control so as to prohibit execution of processing based on one of the first control command and the second control command when the interpreting section determines that both of the first control command and the second control command cannot be concurrently executed based on a print recording medium designated by at least one of the control commands.

12. A computer readable medium storing a program causing a computer to execute image processing, the image processing comprising:
receiving print information including at least a first control command indicating a first print setting and a second control command embedded in a document to be printed and indicating a second print setting;
interpreting the first control command and the second control command; and
performing a control so as to prohibit execution of processing based on one of the first control command and the second control command when the interpreting section determines that both of the first control command and the second control command cannot be concurrently executed based on a print recording medium designated by at least one of the control commands.

13. An information processing system comprising:
an extracting section that extracts print information including at least a first control command indicating a first print setting and a second control command embedded in a document to be printed and indicating a second print setting;
an interpreting section that interprets the first control command and the second control command;
a generating section that generates control information to be used for performing a control so as to prohibit execution of processing based on one of the first control command and the second control command when the interpreting section determines that both of the first control command and the second control command cannot be concurrently executed based on a print recording medium designated by at least one of the control commands; and
a transmitting section that transmits the control information.

14. The information processing system according to claim 13, wherein the generating section generates control information to be used for performing a control so as to prohibit execution of processing based on the second control command when the interpreting section determines that both of the first control command and the second control command cannot be concurrently executed.

15. The information processing system according to claim 13, wherein the generating section generates control information to be used for performing a control so as to execute processing based on both of the first control command and the second control command when the interpreting section determines that both of the first control command and the second control command can be concurrently executed.

16. A method for information processing, comprising:
extracting print information including at least a first control command indicating a first print setting and a second control command embedded in a document to be printed and indicating a second print setting;

interpreting the first control command and the second control command;

generating control information to be used for performing a control so as to prohibit execution of processing based on one of the first control command and the second control command when the interpreting section determines that both of the first control command and the second control command cannot be concurrently executed based on a print recording medium designated by at least one of the control commands; and transmitting the control information.

17. A computer readable medium storing a program causing a computer to execute information processing, the information processing comprising:

extracting print information including at least a first control command indicating a first print setting and a second control command embedded in a document to be printed and indicating a second print setting;

interpreting the first control command and the second control command;

generating control information to be used for performing a control so as to prohibit execution of processing based on one of the first control command and the second control command when the interpreting section determines that both of the first control command and the second control command cannot be concurrently executed based on a print recording medium designated by at least one of the control commands; and transmitting the control information.

* * * * *